Sept. 29, 1964 R. V. ZIMMERMAN 3,150,701
VEGETABLE DICING MACHINE
Filed Sept. 24, 1962 3 Sheets-Sheet 1

INVENTOR.
ROY V. ZIMMERMAN
BY
ATTORNEYS

Sept. 29, 1964    R. V. ZIMMERMAN    3,150,701
VEGETABLE DICING MACHINE
Filed Sept. 24, 1962    3 Sheets-Sheet 2
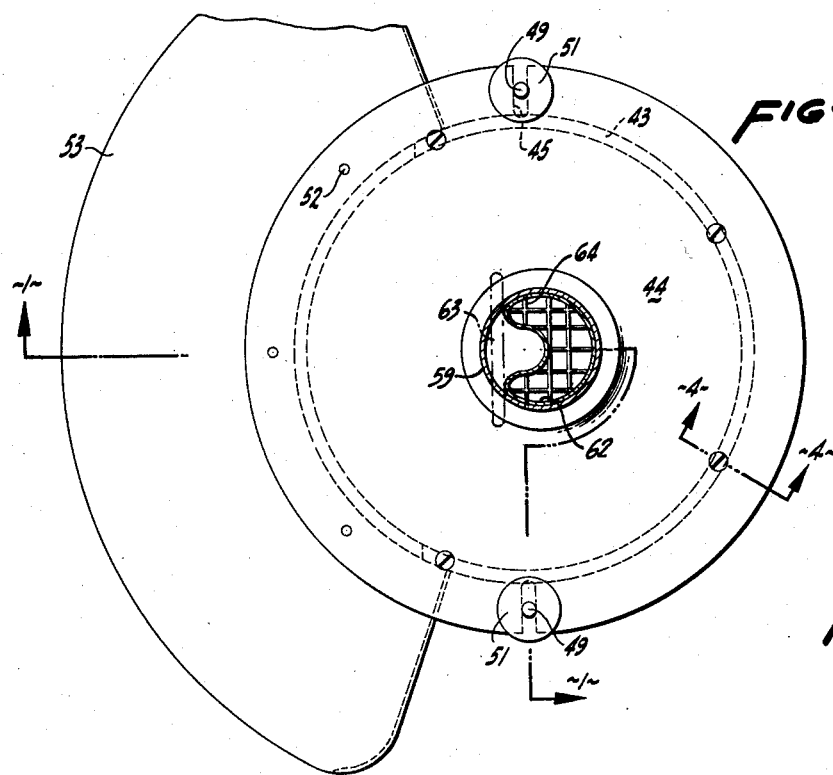
FIG-2
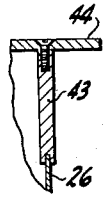
FIG-4
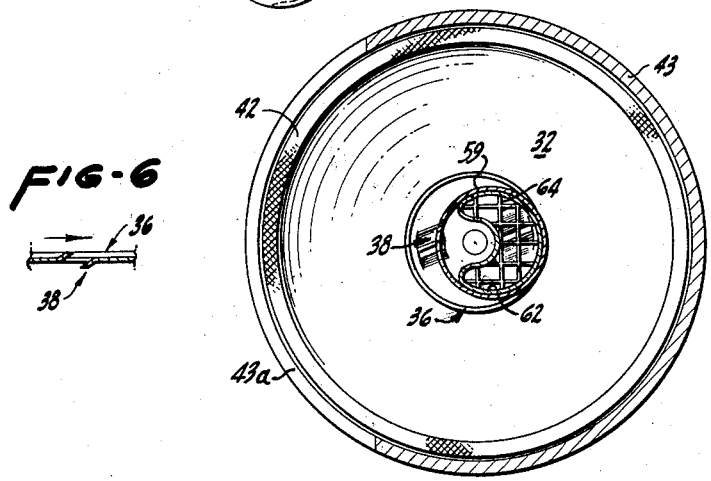
FIG-6
FIG-3
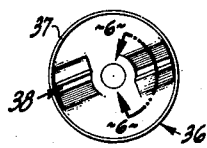
FIG-5
INVENTOR.
ROY V. ZIMMERMAN
BY
ATTORNEYS Sept. 29, 1964     R. V. ZIMMERMAN     3,150,701
VEGETABLE DICING MACHINE
Filed Sept. 24, 1962                    3 Sheets-Sheet 3
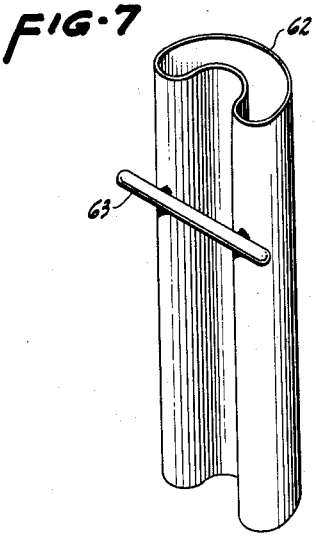
FIG. 7
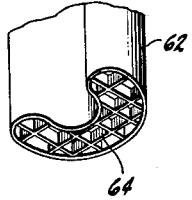
FIG. 8
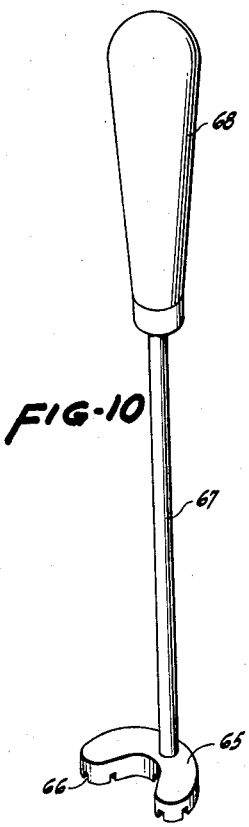
FIG. 10
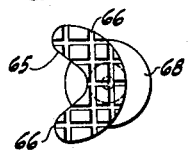
FIG. 11
FIG. 9
FIG. 13
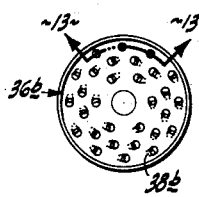
FIG. 12
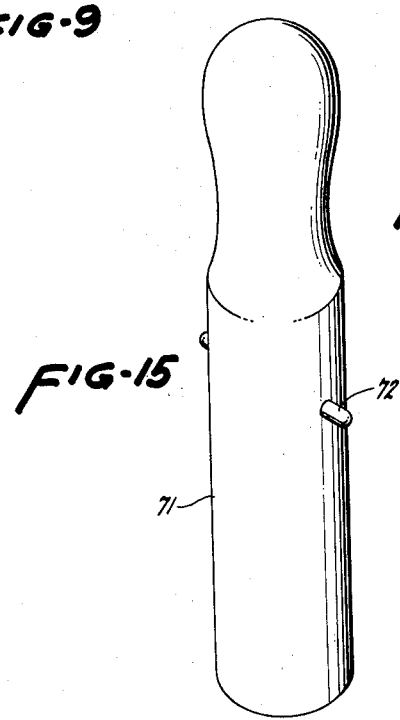
FIG. 15
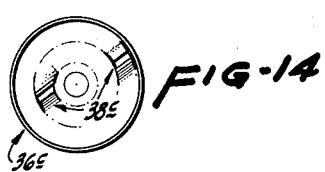
FIG. 14
INVENTOR.
Roy V. Zimmerman
BY Mellin and Hansen
ATTORNEYS

United States Patent Office 3,150,701
Patented Sept. 29, 1964

3,150,701
VEGETABLE DICING MACHINE
Roy V. Zimmerman, Nevada City, Calif., assignor to Ryp Manufacturing Company, Nevada City, Calif., a corporation of California
Filed Sept. 24, 1962, Ser. No. 225,810
1 Claim. (Cl. 146—78)

This invention relates to and in general has for its object the provision of a vegetable processing machine, and particularly to a machine for comminuting and shredding vegetables such as celery and lettuce.

Chopped or comminuted celery is used extensively in soups, salads and Chinese dishes. Lettuce is likewise extensively used in shredded form in making up salads and other dishes.

For the most part, these and other vegetables are reduced manually to the desired form.

More particularly, one of the objects of this invention is the provision of a vegetable processing machine including a rotor bowl provided at the bottom with a slightly elevated disc cutter in combination with means for delivering vegetables to said cutter through a restricted passageway eccentrically disposed with respect to said disc and having close clearance therewith.

Another object of this invention is the provision of a machine of the character above described wherein the lower end of said passageway is provided with a slicing grid for longitudinally slicing vegetables immediately prior to their engagement with said slicing disc.

Still another object of this invention is the provision of a machine of the character above described, wherein said passageway takes the form of an upstanding feed tube and wherein a vegetable pusher of complementary configuration and comparable size can be forced through said tube behind the vegetable being processed.

A further object of this invention is the provision of a machine of the character above described wherein said tube constitutes the stem of a funnel suspended from said pedestal over said bowl.

Another object of this invention is the provision of a machine of the character above described wherein said feed passageway is in the form of a tube suspended within the stem of a funnel supported over said bowl.

A further object of this invention is the provision of a machine of the character above described wherein said bowl is reticulated and circumscribed by a juice receptacle.

Still another object of this invention is the provision of a machine of the character above described wherein provision is made for discharging the contents of said bowl and said receptacle into a common container.

Yet another object of this invention is the provision of a machine of the character above described including a pedestal mounting a bearing assembly; a sleeve journaled in said bearing assembly; a bowl threaded to the upper end of said sleeve; a disc cutter threaded within and to the bottom of said bowl and means mounted on said pedestal for locking said sleeve against rotation when it is desired to disassemble the machine.

The invention possesses other advantageous features, some of which with the foregoing, will be set forth at length in the following description where those forms of the invention which have been selected for illustration in the drawings accompanying and forming a part of the present specification, are outlined in full. In said drawings, one form of the invention is shown, but it is to be understood that it is not limited to such form, since the invention as set forth in the claims may be embodied in other forms.

Referring to the drawings:

FIG. 2 is a horizontal section taken on the section line 2—2 of FIG. 1;

FIG. 3 is a fragmentary horizontal section taken on the section line 3—3 of FIG. 1;

FIG. 4 is a fragmentary section taken on the section line 4—4 of FIG. 2;

FIG. 5 is a fragmentary section taken on the section line 5—5 of FIG. 1;

FIG. 6 is a fragmentary section taken on the arcuate section line 6—6 of FIG. 5;

FIG. 7 is a perspective view of the vegetable feed tube and longitudinal vegetable slicer shown in vertical section in FIG. 1;

FIG. 8 is a fragmentary perspective of the feed tube showing its bottom end slicing grid;

FIG. 9 is a perspective view of the rotary cutter illustrated in top plan view in FIG. 5;

FIG. 10 is a perspective view of a vegetable pusher used for feeding vegetables through the feed tube of FIG. 7;

FIG. 11 is a bottom plan view of the pusher illustrated in FIG. 10;

FIG. 12 is a top plan view of a modified grating disc;

FIG. 13 is a fragmentary section taken on the section line 13—13 of FIG. 12;

FIG. 14 is a further modification of a grating disc similar to that illustrated in FIG. 9;

FIG. 15 is a perspective view of a modified form of vegetable pusher for use independently of the feed tube of FIG. 7;

Figure 1:
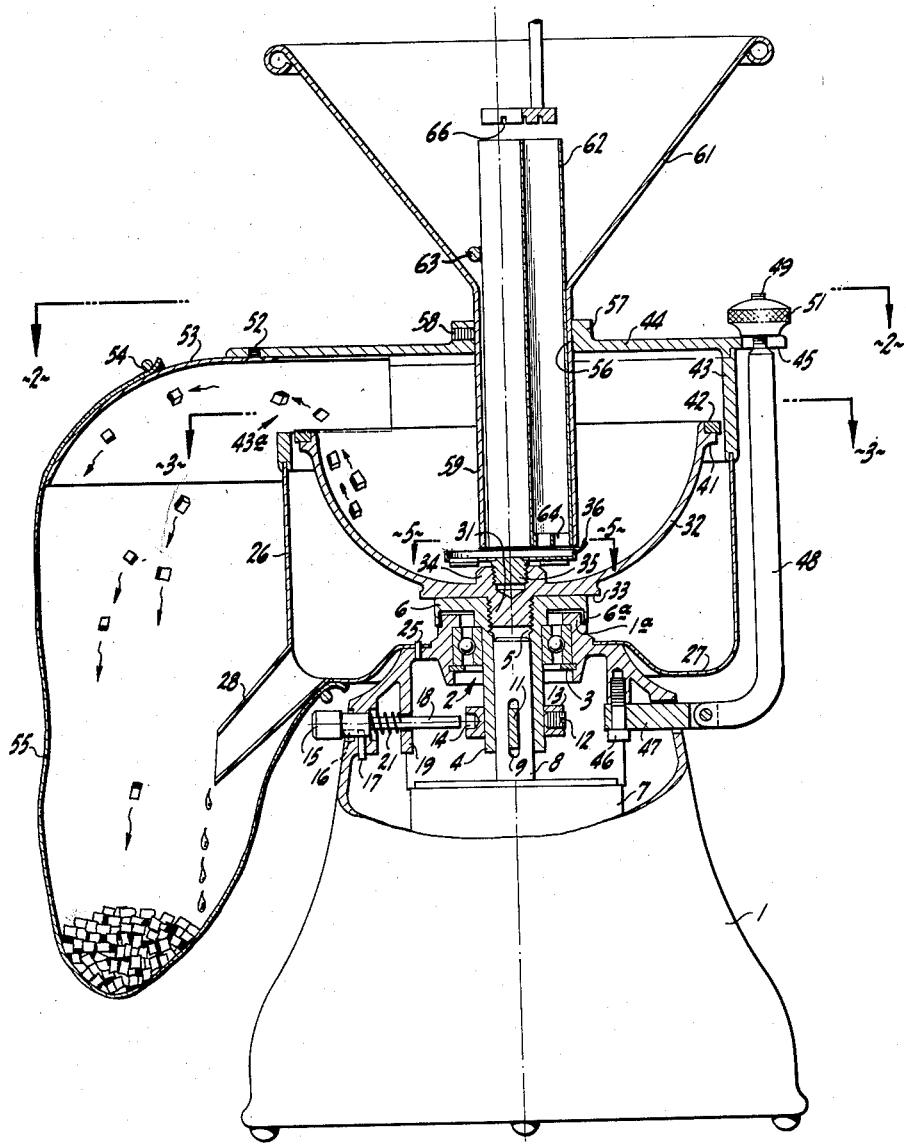
FIG. 1 is a vertical midsection of a vegetable processing machine embodying the objects of my invention taken on the offset section line 1—1 of FIG. 2.

The machine illustrated in these various figures, and more particularly in FIG. 1, includes a base or pedestal 1 provided at its upper end with a conventional bearing assembly 2, held in place by a locking ring 3. Journaled in said bearing assembly is a coupling sleeve 4 internally threaded at its upper end as at 5 and provided with a radially extending flange 6.

Mounted in the pedestal 1 concentrically with the sleeve 4 is an electric motor 7 including a shaft 8 receivable in the sleeve 4 and detachably keyed thereto by a keyway 9 and key 11.

Secured to the lower end of the sleeve 4 by a set screw 12 is a ring 13 and formed therein is a bore or recess 14 slidably mounted in the wall of the pedestal 1. In peripheral alignment with the recess 14 is locking button 15. Preferably, the button 15 is keyed to the pedestal 1 by a keyway 16 and pin 17. Formed integral with the button 15 is a stem 18, the inner end of which is receivable in the recess 14 when the pin 15 is depressed. Formed integral with the upper end of the pedestal is a depending web 19 through which the stem 18 passes with positive clearance. Surrounding the stem 18 between the button 15 and the web 19 is a compression spring 21 serving to bias the button 15 to its unlocked position.

As a result of this construction, the button 15 serves as a means for locking the sleeve 4 and its associate parts against rotation.

Detachably mounted on the upper end of the pedestal 1 by one or more upstanding pins 25 is a stationary cylindrical juice receptacle 26 formed at its lower end with an annular sump 27 communicating and formed integral with an inclined spout 28.

Threaded into the upper end of the coupling sleeve 4 is the stem 31 of a reticulated or slotted bowl 32, said bowl being provided with a flat bottom 33 seated on the flange 6 and with an internally threaded upwardly extending central boss 34. Threaded into the boss 34 is the stem 35 of a shredder cup or disc 36. As illustrated in FIG. 5, the cup 36 is provided with an upstanding rim 37 and struck from the bottom of the cup are two diametrically opposed pairs of shredding blades 38. One blade of each such pair so illustrated in FIG. 6 is upwardly inclined in the direction of rotation of the cup as indicated by the arrow in this figure, whereas the other blade of the pair declines rearwardly.

To stiffen the bowl 32, its upper peripheral edge is provided with an outwardly extending flange 41, and seated thereon is a ring 42 circumscribing the edge of the bowl.

Seated on the upper edge of the juice receptacle 26, and having a tongue-and-groove connection therewith, is a ring 43, this ring being provided as at 43a with a sector-shaped opening or throat.

Mounted on top of the ring 43, and having a butt-lap connection therewith, is a cover plate 44. Formed on the periphery of the cover plate 44 are a pair of diametrically opposed slots 45. Secured to the top of the pedestal 1 interiorly thereof by screws 46, and extending through the side walls of the pedestal, are diametrically opposed fingers 47. Pivoted to the outer ends of each of the fingers 47 is a locking rod 48 having an upper threaded end 49 receivable in one of the slots 45. Threaded on each end 49 is a knurled nut 51 arranged to detachably clamp the cover plate 44 and the ring 43 to the receptacle 26.

Fastened to the cover plate by screws 52 is a sector-shaped shroud 53 overlying the sector-shaped throat 43a of the ring 43 and the spout 28.

Surrounding the shroud 53 and the spout 28, and secured thereto by any suitable means such as a rubber band 54, is a plastic bag 55.

Formed in the cover plate 44, and eccentrically disposed relative to the axis of the motor shaft 8, is a circular opening 56 circumscribed by a boss 57 snugly receivable in the opening 56 and secured to the cover plate 44 by a set screw 58 is the cylindrical or tubular extension stem 59 of a funnel 61. Preferably, the diameter of the stem 59 should be smaller than the outer diameter of the shredder cup 36, and the lower end of the stem 59 should have positive clearance with the rim 37 of the cup 36, all as illustrated in FIG. 1.

Receivable within the funnel 61 and extending to the lower end of the funnel stem 59 is a generally kidney-shaped feed tube 62. Welded to the tube 62 transversely across its concave side is a supporting and positioning rod 63 arranged to engage the flared walls of the funnel 61. The length of the rod 63 and the location of the feed tube 62 are such that the rod serves to suspend the tube with its convex side in engagement with one side of the funnel stem 59 and with its lower end substantially flush with the lower end of the funnel stem 59. In this position the lower end of the feed tube lies in the locus of the rotating shredder blades 38. Provided in and extending across the lower open end of the feed tube 62 is a slicing grid 64.

Receivable in the feed tube 62 is a kidney-shaped pusher shoe 65 provided on its lower face with crossed slots 66 complementary to the slicing grid 64 and arranged to receive such grid. The shoe 65 is mounted on a rod 67 of a length slightly greater than the length of the feed tube 62 and terminated at its upper end in a handle 68 (FIG. 10).

Also provided for feeding vegetables through the funnel 61 and its stem 59, but with the feed tube 62 removed therefrom, is a cylindrical pusher 71 (FIG. 15) of a diameter slightly less than the inner diameter of the funnel stem 59. Extending diametrically through the pusher 71 is a stop pin 72 arranged to contact the flared walls of the funnel 61 and serving to prevent the lower end of the pusher from passing downwardly beyond the level of the funnel stem.

As illustrated in FIG. 9 the shredder cup 36a may be provided with diametrically offset rather than diametrically opposed shredding blades 38a.

A further modification of a shredder cup 36b is shown in FIGS. 12 and 13 wherein the bottom of the cup is provided with cheese grater type of cutting members 38b.

Finally, and as illustrated in FIG. 14, the shredder cup 36c can be provided with diametrically opposed but radially offset shredding blades 38c.

In the use of the machine as illustrated in FIG. 1, that is with the feed tube 62 in place, thin elongated vegetables such as celery, are introduced into and pushed through the feed tube 62 with the aid of the pusher shoe 65 if necessary. As the celery passes the grid 64 it is sliced longitudinally and when the sliced celery enters the shredding cup 36 it is cut transversely into small dice. The depth of the dice of course depends on the depth of the cutting blades 38. The diced celery and celery juice drop through the bottom of the shredding cup onto the walls of the reticulated or slotted bowl 32. Since the bowl 32 is preferably rotating at a speed in the order of 10,000 r.p.m., the resulting centrifugal forces to which the diced celery and its juice are subjected causes the celery juice to be slung out through the slots or holes of the bowl into the container 26 and causes the diced celery to travel up the bowl and over the lips of the bowl and the container and into the bag 55. The juice flows by gravity through the spout 28 and then joins the diced celery in the bottom of the bag.

Here it should be noted that since the bottom face of the pusher shoe 65 is provided with crossed slots 66 for the accommodation of the slicing grid blades 64, it is possible to push the entire head of a stalk of celery through the slicing grid and therefore, dice it.

If it is desired to use the machine for shredding lettuce or other vegetables, the feed tube 62 is removed and the lettuce is cut into portions sufficiently small to be fed through the funnel stem 59 with the aid of the cylindrical pusher 71. In this case, the lettuce is merely continuously shredded by the blades 38 as it passes through the bottom of the funnel stem 59. Any juice that may result from this operation passes through the bowl into the container 26 and then through the spout 28 into the bag 55. The shredded lettuce on the other hand travels up the side walls of the bowl and then drops by gravity into the bag 55 to join the juice.

If it is desired to effect and maintain a separation of the juice and solids, the bag 55 is merely fastened above the spout 28 and a separate container is placed below the spout.

To disassemble the machine for washing and storing, the funnel can be dismounted from the coverplate 44 by merely backing up the set screw 58. To remove the coverplate with or without the funnel 59, the nuts 51 are backed off and the rods 48 swung away from the slots 45. This having been done, the ring 43 can be removed. Following this, the locking button 15 is depressed and the bowl 32 slowly rotated until the recess of bore 14 comes into alignment with the locking stem 18 and so permits said stem to enter the bore. The coupling sleeve is thus locked against rotation and when so locked, the bowl 32 can be rotated relative to the bowl and thus unthreaded from the coupling sleeve. After this, the locking button 15 can be released and the shredder cup 36 unscrewed from the bowl.

Preferably all of the surfaces of the machine having contact with vegetables or fruit to be processed should be made of stainless steel so as to withstand any corrosive action to which they may be subjected. Also, it is to be noted from an inspection of FIG. 1, that the radial flange 6 is provided with a depending skirt 6a surrounding the upper end of the bearing housing 1a of the pedestal with close clearance. In this manner, the bearing assembly is protected against contact with any fruit or vegetable juices.

Although it may be apparent from the construction of the machine, it might here be observed that the funnel stem 59 serves to confine any material fed through it, within a zone commensurate with the shredding cup 36, and thus insures that all material passing through the funnel stem is subjected to the action of the shredding cup and thus properly reduced in size. This confining action also obtains when vegetables are fed through the tube 62 rather than directly through the funnel stem 59.

From the above description it will be seen that I have provided a centrifugal machine for either dicing or shredding vegetables and for effecting a separation of said vegetables and resulting juices and that this machine has been so constructed that it can readily be disassembled for cleaning purposes.

If a separation of the solids and liquids is not desired, a solid bowl or basket 32 can be used and in that case, both solids and liquids travel upwardly along the sides of the bowl under the action of centrifugal force and over the lip of the bowl into the bag 55. The receptacle ring 43 of course prevents solids from spilling over the bowl rim or lip, except through the opening or throat 43a.

I claim:

A food processing machine comprising: a hollow pedestal; a bearing assembly mounted in the upper end of said pedestal; a sleeve journaled in said assembly for rotation on a vertical axis, said sleeve being internally threaded at its upper end; a bowl provided at its bottom with a depending threaded stud, said stud being threaded into the upper end of said sleeve, and an upwardly extending, internally threaded boss formed in the bottom of said bowl; a disc shredder cup having a stem threaded into said boss, said cup having an upstanding rim and diametrically opposed pairs of shredding blades struck from the bottom of said cup, each blade located radially out from said boss and position-spaced above the bottom of said bowl; means for rotating said bowl together with said disc shredder cup upon said vertical axis and bearing assembly; and a guide tube mounted above said shredder cup in vertical alignment with and above the sweep of said shredding blades, the lower end of said guide tube having close clearance with said blades and provided with a slicing grid mounted therein.

References Cited in the file of this patent

UNITED STATES PATENTS

| | | |
|---|---|---|
| 1,395,369 | Stoddard et al. | Nov. 1, 1921 |
| 1,416,853 | Maine | May 23, 1922 |
| 2,161,480 | MacHaynes | June 6, 1939 |
| 2,305,193 | Reynolds et al. | Dec. 15, 1942 |
| 2,481,010 | Gundelfinger | Sept. 6, 1949 |
| 2,513,519 | Reynolds | July 4, 1950 |
| 2,793,667 | Hall | May 28, 1957 |